US012698090B1

(12) United States Patent
Abdelnour et al.

(10) Patent No.: US 12,698,090 B1
(45) Date of Patent: Aug. 4, 2026

(54) COMBINED OFFSET GEARBOX ARRANGEMENT FOR HYBRID-ELECTRIC POWERPLANT

(71) Applicant: Pratt & Whitney Canada Corp., Longueuil (CA)

(72) Inventors: Michel Abdelnour, Greenfield Park (CA); Eric S. Durocher, Boucherville (CA); Daniel Ouimette, Terrebonne (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 19/235,194

(22) Filed: Jun. 11, 2025

(51) Int. Cl.
| | |
|---|---|
| *B64D 35/022* | (2025.01) |
| *B64D 27/02* | (2006.01) |
| *B64D 27/33* | (2024.01) |
| *B64D 35/08* | (2025.01) |

(52) U.S. Cl.
CPC ........... *B64D 35/022* (2024.01); *B64D 27/02* (2013.01); *B64D 27/33* (2024.01); *B64D 35/08* (2013.01)

(58) Field of Classification Search
CPC ...... B64D 35/022; B64D 35/08; B64D 27/33; B64D 27/02; B64D 27/24
See application file for complete search history.

(56) References Cited

U.S. PATENT DOCUMENTS

| | | | | |
|---|---|---|---|---|
| 10,767,566 B2 * | 9/2020 | Pal | .......................... | B64D 33/08 |
| 10,907,494 B2 * | 2/2021 | Long | ...................... | B64D 31/06 |
| 12,187,444 B1 * | 1/2025 | Brito | ...................... | B64D 27/33 |
| 2017/0190441 A1 * | 7/2017 | Mackin | ................... | B64D 41/00 |
| 2024/0417083 A1 * | 12/2024 | Durocher | ............... | B64D 35/00 |

FOREIGN PATENT DOCUMENTS

| | | |
|---|---|---|
| WO | 2022162315 A1 | 8/2022 |
| WO | 2025045726 A1 | 3/2025 |

* cited by examiner

*Primary Examiner* — Rodney A Bonnette
(74) *Attorney, Agent, or Firm* — Getz Balich LLC

(57) ABSTRACT

A propulsion system for an aircraft is provided. The propulsion system includes an engine including a first input shaft and a drivetrain coupled to the first input shaft. The drivetrain includes an output shaft, a gear assembly, an electric motor, and a second input shaft. The gear assembly includes a main gear mounted to the output shaft, and a bevel ring gear integrated on a face of the main gear. The main gear, the bevel ring gear, and the output shaft are rotatable about a first rotational axis. The electric motor includes a rotor rotatable about a second rotational axis. The second rotational axis is perpendicular to the first rotational axis. The second input shaft couples the rotor to the bevel ring gear. The second input shaft is rotatable about the second rotational axis.

20 Claims, 5 Drawing Sheets

COMBINED OFFSET GEARBOX ARRANGEMENT FOR HYBRID-ELECTRIC POWERPLANT

TECHNICAL FIELD

This disclosure relates generally to hybrid-electric propulsion systems for aircraft and, more particularly, to a propulsion system drivetrain including an electric motor.

BACKGROUND OF THE ART

Hybrid-electric propulsion systems for aircraft may typically include an electric motor configured to supplement or replace a propulsion system engine (e.g., a gas turbine engine, an intermittent combustion engine, etc.) output to one or more propulsors. Various hybrid-electric propulsion system configurations are known. While these known propulsion system configurations may be suitable for their intended purposes, there is always room in the art for improvement.

SUMMARY

According to an aspect of the present disclosure, a propulsion system for an aircraft is provided. The propulsion system includes an engine including a first input shaft and a drivetrain coupled to the first input shaft. The drivetrain includes an output shaft, a gear assembly, an electric motor, and a second input shaft. The gear assembly includes a main gear mounted to the output shaft, and a bevel ring gear integrated on a face of the main gear. The main gear, the bevel ring gear, and the output shaft are rotatable about a first rotational axis. The electric motor includes a rotor rotatable about a second rotational axis. The second rotational axis is perpendicular to the first rotational axis. The second input shaft couples the rotor to the bevel ring gear. The second input shaft is rotatable about the second rotational axis.

In any of the aspects or embodiments described above and herein, the propulsion system may further include a propulsor mounted on the output shaft and rotatable about the first rotational axis.

In any of the aspects or embodiments described above and herein, the second input shaft may extend from a proximal end coupled to the rotor to a distal end having a bevel input gear. The bevel input gear may be perpendicularly engaged with the bevel ring gear.

In any of the aspects or embodiments described above and herein, the propulsion system may further include a propeller control unit (PCU) coupled to the output shaft.

In any of the aspects or embodiments described above and herein, the gear assembly may include a reduction gear assembly including the main gear and at least one offset gear. The at least one offset gear may be coupled to an accessory load.

In any of the aspects or embodiments described above and herein, the main gear may be engaged with the at least one offset gear.

In any of the aspects or embodiments described above and herein, the accessory load may include an oil pump connected in fluid communication with the PCU.

In any of the aspects or embodiments described above and herein, the gear assembly may include a reduction gear assembly including the main gear and at least one offset gear. The at least one offset gear may be coupled to the first input shaft, and the first input shaft may be rotatable about a third rotational axis radially offset from the first rotational axis.

In any of the aspects or embodiments described above and herein, the drivetrain may further include a gearbox housing, and the electric motor may further include a static structure engaged with the rotor and coupled to the gearbox housing.

According to an aspect of the present disclosure, a propulsion system for an aircraft is provided. The propulsion system includes an engine having a first input shaft, and a drivetrain coupled to the first input shaft. The drivetrain includes an output shaft, a reduction gear assembly, and an electric motor. The reduction gear assembly includes at least a main gear, a first offset gear, and a bevel ring gear. The main gear is mounted to the output shaft. The bevel ring gear is integrated on a face of the main gear. The first offset gear is coupled to the first input shaft. The main gear, the bevel ring gear, and the output shaft are rotatable about a first rotational axis. The electric motor includes a rotor rotatable about a second rotational axis. The second rotational axis is perpendicular to the first rotational axis, and the rotor is coupled to the bevel ring gear.

In any of the aspects or embodiments described above and herein, the propulsion system may further include a propulsor mounted on the output shaft and rotatable about the first rotational axis.

In any of the aspects or embodiments described above and herein, the drivetrain may further include a second input shaft rotatable about the second rotational axis and coupling the rotor to the bevel ring gear.

In any of the aspects or embodiments described above and herein, the second input shaft may extend from a proximal end coupled to the rotor to a distal end having a bevel input gear. The bevel input gear may be perpendicularly engaged with the bevel ring gear.

In any of the aspects or embodiments described above and herein, the first input shaft may be rotatable about a third rotational axis that is radially offset from the first rotational axis.

In any of the aspects or embodiments described above and herein, the propulsion system may further include a PCU coupled to the output shaft.

In any of the aspects or embodiments described above and herein, the reduction gear assembly may further include a second offset gear coupled to an accessory load.

In any of the aspects or embodiments described above and herein, the main gear may be engaged with the second offset gear.

In any of the aspects or embodiments described above and herein, the accessory load may include an oil pump connected in fluid communication with the PCU.

In any of the aspects or embodiments described above and herein, the drivetrain may further include a gearbox housing, and the electric motor may further include a static structure engaged with the rotor and coupled to the gearbox housing.

According to an aspect of the present disclosure, a propulsion system for an aircraft is provided. The propulsion system includes an engine including an input shaft, and a drivetrain coupled to the input shaft. The drivetrain includes an output shaft, a gear assembly, and an electric motor. The gear assembly includes a main gear mounted to the output shaft, and a bevel ring gear integrated on a face of the main gear. The main gear, the bevel ring gear, and the output shaft are rotatable about a first rotational axis. The electric motor includes a rotor rotatable about a second rotational axis. The second rotational axis is perpendicular to the first rotational axis, and the rotor is coupled to the bevel ring gear. The propulsion system also includes a PCU mounted on the output shaft.

The foregoing features and elements may be combined in various combinations without exclusivity, unless expressly indicated otherwise. For example, aspects and/or embodiments of the present disclosure may include any one or more of the individual features or elements disclosed above and/or below alone or in any combination thereof. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
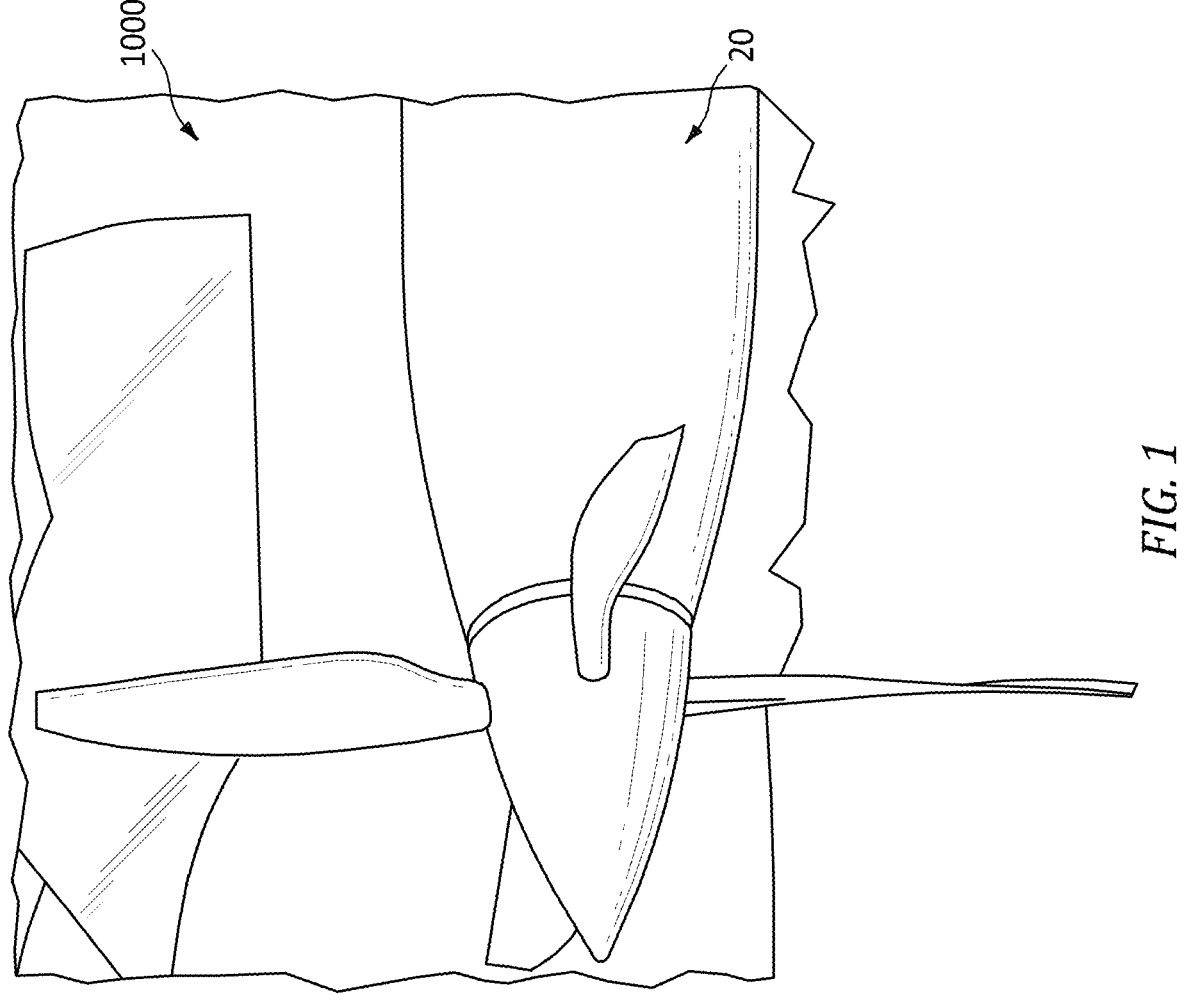
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
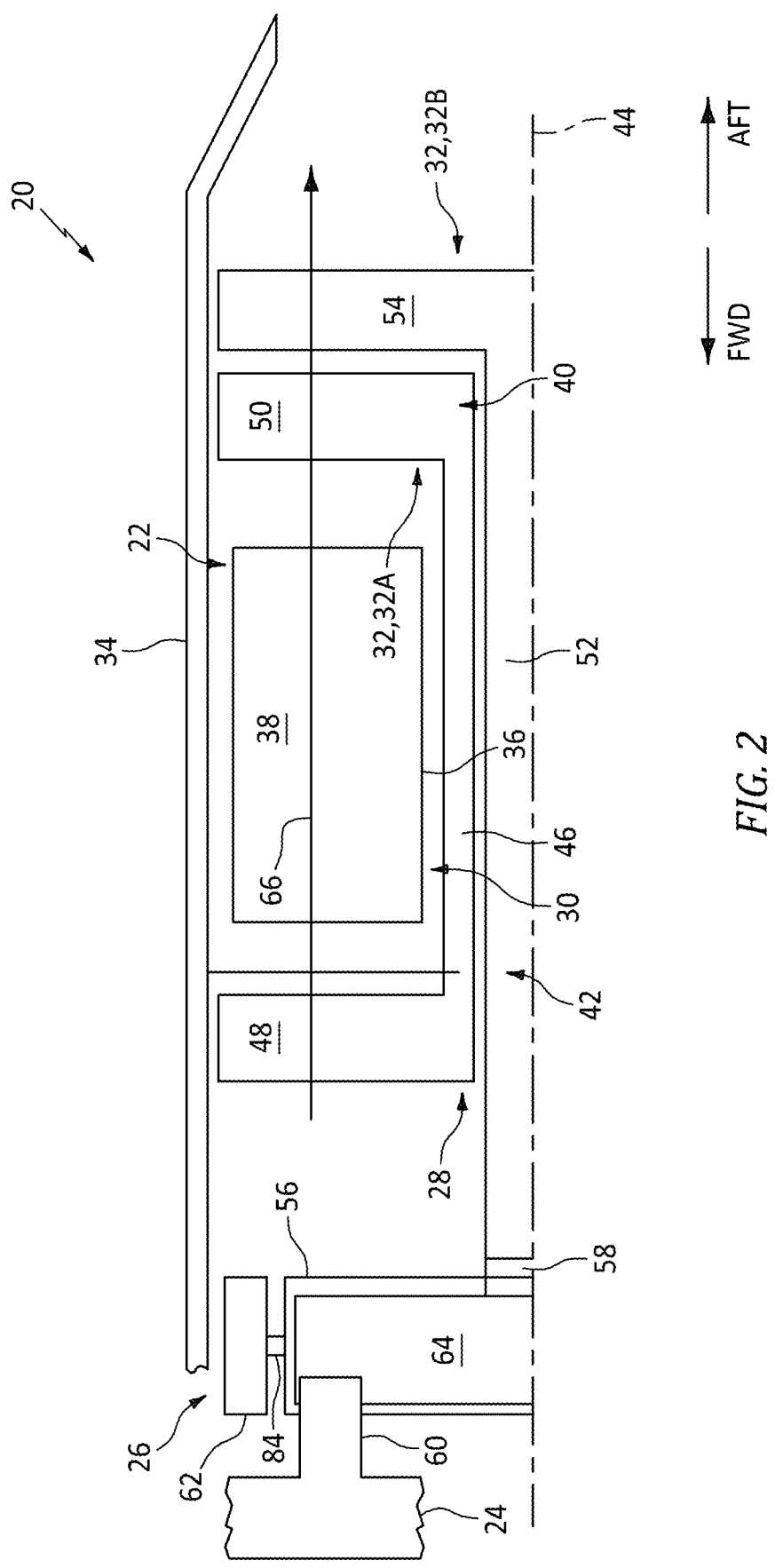
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, a propulsor 24, and a drivetrain 26. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, or other intermittent combustion engines.

The engine 22 of FIG. 2 includes a compressor section 28, a combustor section 30, a turbine section 32, and an engine static structure 34. The combustor section 30 includes a combustor 36 (e.g., an annular combustor) forming a combustion chamber 38. The turbine section 32 includes a high-pressure turbine 32A and a power turbine 32B.

Components of the compressor section 28 and/or the turbine section 32 of FIG. 2 form a first rotational assembly 40 (e.g., a high-pressure spool) and a second rotational assembly 42 of the engine 22. The first rotational assembly 40 and the second rotational assembly 42 are mounted for rotation about a rotational axis 44 (e.g., an axial centerline) of the engine 22 relative to the engine static structure 34.

The first rotational assembly 40 includes a first shaft 46, a bladed compressor rotor 48 for the compressor section 28, and a bladed first turbine rotor 50 for the high-pressure turbine 32A. The first shaft 46 interconnects the bladed compressor rotor 48 and the bladed first turbine rotor 50.

The second rotational assembly 42 of FIG. 2 includes a second shaft 52 (e.g., an engine output shaft) and a bladed second turbine rotor 54 for the power turbine 32B. The second shaft 52 is connected to the bladed second turbine rotor 54. The second shaft 52 is coupled to the propulsor 24 by the drivetrain 26.

The drivetrain 26 includes a gearbox 56 (e.g., a reduction gearbox (RGB)), an input shaft 58, an output shaft 60 (e.g., a propulsor output shaft or a propeller shaft), and an electric motor assembly 62. The gearbox 56 includes and houses a gear assembly 64. The gear assembly 64 couples the input shaft 58 with the output shaft 60. For example, the gear assembly 64 may be a reduction gear assembly configured to drive rotation of the output shaft 60 at a reduced rotational speed relative to the input shaft 58. The input shaft 58 is coupled to (e.g., mounted on) the second shaft 52, and interconnects the second shaft 52 with the gear assembly 64. The output shaft 60 is coupled to (e.g., mounted on) the propulsor 24, and interconnects the propulsor 24 with the gear assembly 64.

The electric motor assembly 62 includes one or more electric motors disposed axially perpendicular to the output shaft 60. An e-motor input shaft 84 interconnects the electric motor assembly 62 with the gear assembly 64. This configuration allows the engine 22 and the electric motor assembly 62 to affect the gear assembly 64, independently or in combination, as described in greater detail below.

The engine static structure 34 includes engine casings, cowlings, and other fixed (e.g., non-rotating) structures of the engine 22 which form, house, and/or support components of the engine 22 such as, but not limited to, those of the compressor section 28, the combustor section 30, and the turbine section 32. The engine static structure 34 may include one or more bearing assemblies configured to rotationally support components of the first rotational assembly 40 and the second rotational assembly 42.

During operation of the propulsion system 20 of FIG. 2, ambient air enters the propulsion system 20 (e.g., through an air intake) and is directed through the engine 22 along a core gas flow path 66. The ambient air flow along the core gas flow path 66 is compressed in the compressor section 28 by rotation of the bladed compressor rotor 48, and directed into the combustor 36 (e.g., the combustion chamber 38). Fuel is injected into the combustion chamber 38 and mixed with the compressed air to provide a fuel-air mixture. This fuel-air mixture is ignited, and combustion products thereof flow through the high-pressure turbine 32A and the power turbine 32B and are exhausted from the propulsion system 20. The bladed first turbine rotor 50 and the bladed second turbine rotor 54 rotationally drive the first rotational assembly 40 and the second rotational assembly 42, respectively, in response to the combustion gas flow through the high-pressure turbine 32A and the power turbine 32B along the core gas flow path 66. The second rotational assembly 42 (e.g., the second shaft 52) drives rotation of the propulsor 24 through the drivetrain 26. The electric motor(s) of the electric motor assembly 62 may be selectively operated to drive rotation of the propulsor 24 through the e-motor input shaft 84 in combination with the gear assembly 64. Additionally, the electric motor(s) of the electric motor assembly

62 may be driven to generate electrical power for one or more electrical systems of the propulsion system 20 and/or the aircraft 1000 (see FIG. 1) and/or to store energy for future propulsion use.

Figure 3:
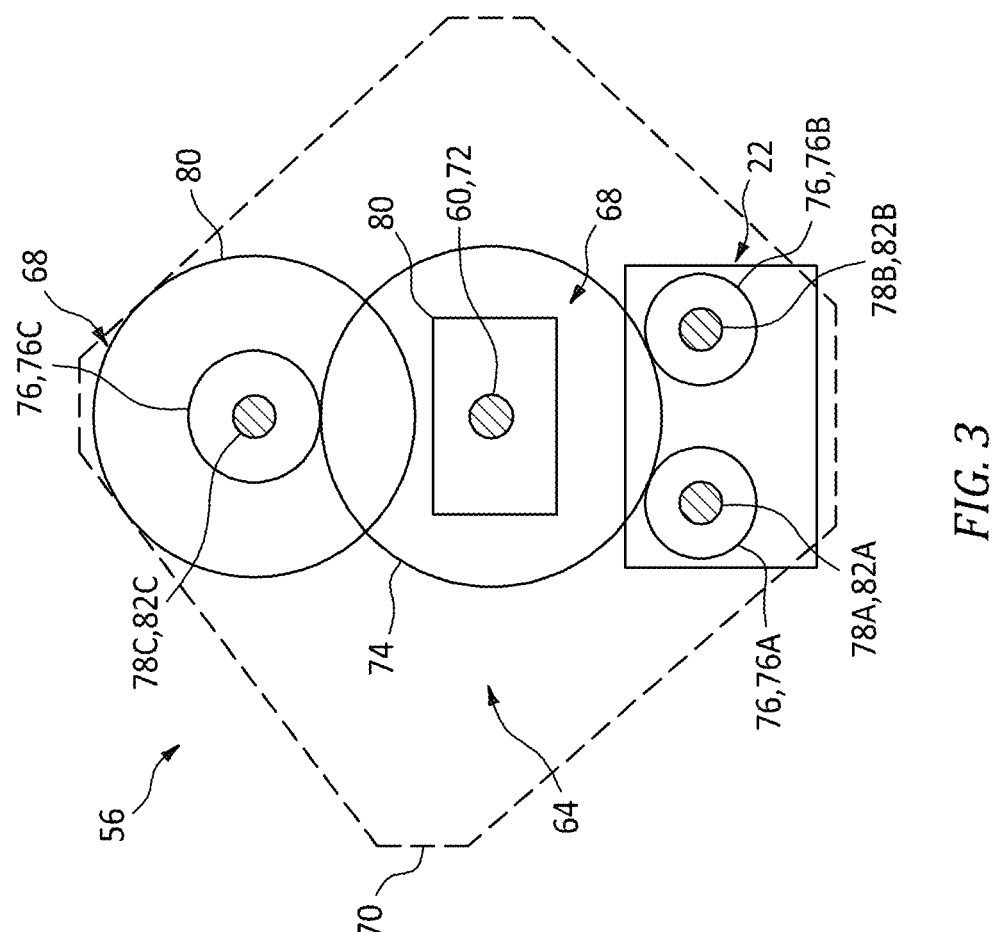
FIG. 3 schematically illustrates a cutaway, front view of a gearbox for the aircraft propulsion system, in accordance with one or more embodiments of the present disclosure.

FIG. 3 schematically illustrates a cutaway, front view of the gearbox 56 of FIG. 2. The gearbox 56 is coupled to at least accessory load assemblies 68 and the engine 22. The gearbox 56 includes a gearbox housing 70, the output shaft 60, and the gear assembly 64. The gearbox housing 70 may provide support for the accessory load assemblies 68, and may additionally include or otherwise support one or more bearing assemblies for rotatably supporting the output shaft 60. The gear assembly 64 of FIG. 3 is a reduction gear assembly that allows the output shaft 60 to rotate at a reduced rate compared to offset gears and corresponding shafts.

The output shaft 60 extends circumferentially about (e.g., completely around) an axial centerline 72, which is also a rotational axis of the output shaft 60. The gear assembly 64 of FIG. 3 includes a main gear 74 (e.g., output gear) and offset gears 76. The main gear 74 extends circumferentially about (e.g., completely around) the axial centerline 72, which is also a rotational axis of the main gear 74. The main gear 74 is fixedly mounted to and circumscribes the output shaft 60. The main gear 74 is configured for rotation about the axial centerline 72 with the output shaft 60. The main gear 74 may include gear teeth engaged with (e.g., meshed with) gear teeth of one or more of the offset gears 76. The offset gears 76 are radially offset from the axial centerline 72. Each of the offset gears 76 is rotatable about a respective rotational axis 78A, 78B, 78C that is radially offset from the rotational axis (the axial centerline 72) of the output shaft 60.

The input shaft extends circumferentially about (completely around) the rotational axis 44, which is radially offset from the axial centerline 72. The input shaft 58 may be coupled to the main gear 74 through a geared arrangement, such as a double layshaft assembly that includes two offset gears 76A, 76B thereby coupling the engine 22 to the gear assembly 64, via shafts 82A, 82B. Alternatively, the input shaft 58 may be coupled to a single offset gear 76A. A third offset gear 76C may be coupled to a respective accessory load assembly 68 to drive the respective accessory load assembly 68 in response to rotation of the main gear 74. Each of the offset gears 76 may be sized (e.g., relative to the main gear 74) to facilitate a suitable rotational speed (e.g., speed ratio) for the different rotational components (e.g., the propulsor 24, the engine 22, the accessory load assemblies 68, etc.) coupled to the gear assembly 64. The present disclosure is not limited to any particular number, arrangement, size, or other configuration of the offset gears 76.

Each of the accessory load assemblies 68 may be disposed within or axially adjacent to the gearbox housing 70. For example, the accessory load assemblies 68 may be disposed at (e.g., on, adjacent, or proximate) an aft end of the gearbox housing 70. Each of the accessory load assemblies 68 includes at least one accessory load 80. The at least one accessory load 80 may be mounted to or otherwise supported by the gearbox housing 70. For example, the at least one accessory load 80 may be mounted to an exterior or an interior of the gearbox housing 70. The accessory load assemblies 68 may be disposed axially coincident with the engine 22. Each of the accessory load assemblies 68 may further include a shaft 82C. The at least one accessory load 80 of each of the accessory load assemblies 68 may be coupled to a respective one of the gears 74, 76C of the gear assembly 64. The at least one accessory load 80 (e.g., a PCU) may be mounted to and driven by the main gear 74 by the output shaft 60. The at least one accessory load 80 (e.g., an oil pump) may be mounted to and driven by the third offset gear 76C by, for example, the shaft 82C.

Figure 4:
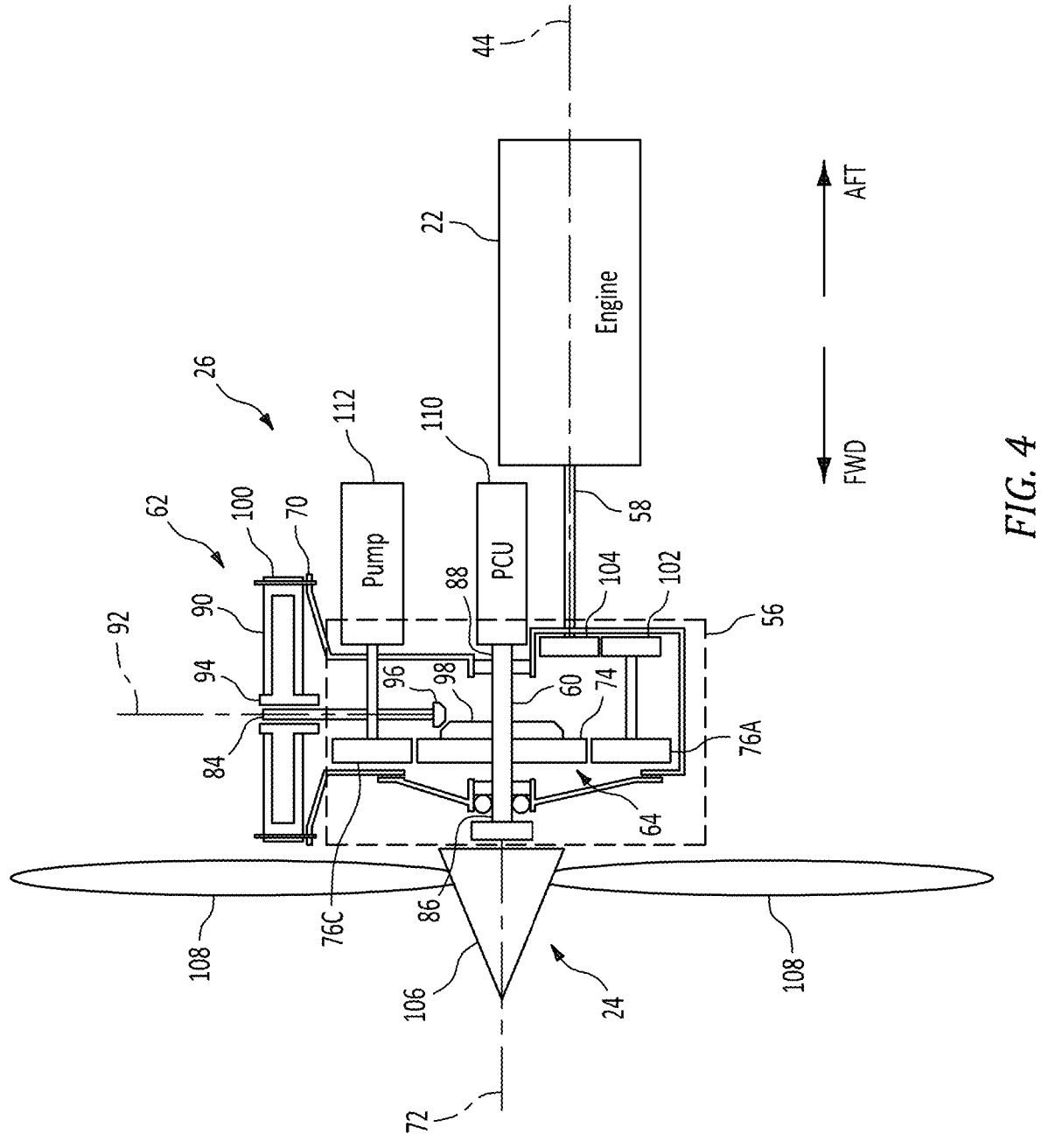
FIG. 4 schematically illustrates a cutaway, side view of a portion of the aircraft propulsion system, in accordance with one or more embodiments of the present disclosure.

The at least one accessory load 80 for each of the accessory load assemblies 68 facilitates one or more support functions of the aircraft 1000 or its propulsion system 20 (see FIG. 1). FIGS. 3 and 4 illustrate an example of the at least one accessory load 80 including, but not limited to, a PCU and an oil pump. The present disclosure, however, is not limited to the aforementioned exemplary accessory loads 80 and the at least one accessory load 80 may include additional or alternative rotational loads or other loads, such as an air compressor unit, an electrical generation unit (e.g., a low-voltage generator), and a hydraulic pump.

Figure 5:
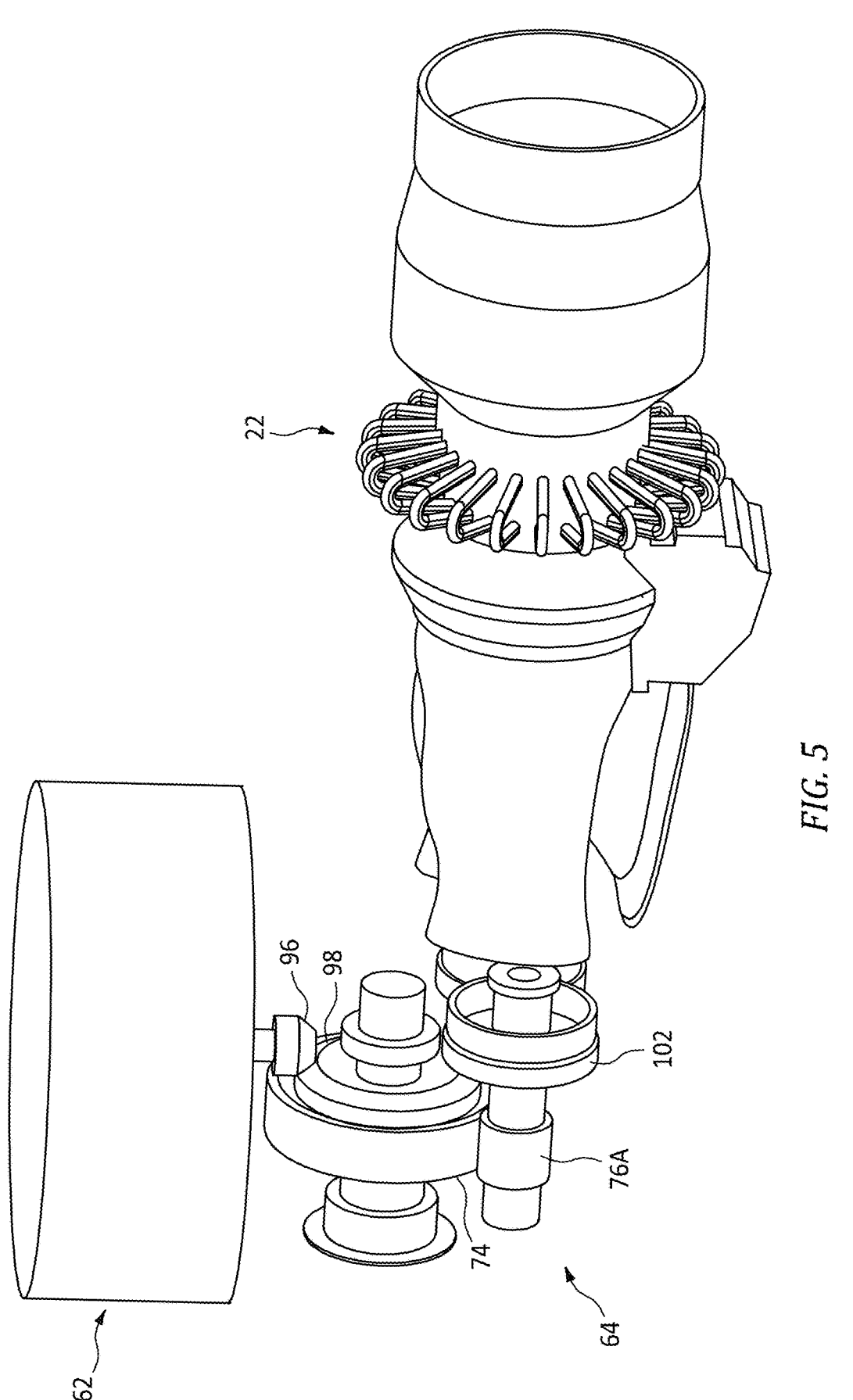
FIG. 5 schematically illustrates a perspective view of a portion of the aircraft propulsion system, in accordance with one or more embodiments of the present disclosure.

FIG. 4 schematically illustrates a cutaway, side view of a portion of the propulsion system 20 showing the propulsor 24, the drivetrain 26, and the engine 22. FIG. 5 illustrates a perspective view of the propulsion system 20 showing the gear assembly 64, the electric motor assembly 62, and the engine 22. The output shaft 60 extends from a first axial end 86 to a second axial end 88 along the axial centerline 72 in an aft direction. The first axial end 86 is mounted to or otherwise disposed at (e.g., on, adjacent, or proximate) the propulsor 24 such that rotation of the output shaft 60 about the axial centerline 72 drives rotation of the propulsor 24. The main gear 74 may be mounted to an axially intermediate portion of the output shaft 60 between the first axial end 86 and the second axial end 88. Alternatively, the main gear 74 may be mounted to the output shaft 60 at (e.g., on, adjacent, or proximate) the second axial end 88.

The electric motor assembly 62 of the drivetrain 26 includes an electric motor 90 having the e-motor input shaft 84. The e-motor input shaft 84 extends circumferentially about (e.g., completely around) an e-motor axis 92, which is also a rotational axis of the e-motor input shaft 84. The e-motor axis 92 is axially perpendicular to the axial centerline 72, such that the e-motor input shaft 84 is axially perpendicular to the output shaft 60 and the electric motor 90 is radially offset from the output shaft 60. The electric motor 90 includes a rotor 94 that extends circumferentially about (e.g., completely around) the e-motor axis 92, which is also a rotational axis of the rotor 94. The rotor 94 is coupled to and circumscribes the e-motor input shaft 84. The rotor 94 is configured for rotation about the e-motor axis 92 with the e-motor input shaft 84.

The e-motor input shaft 84 extends from a proximal end at the rotor 94 to a distal end having a bevel input gear 96. A bevel ring gear 98 is coupled to or integrated onto an aft side or face of the main gear 74. In an alternative embodiment, the bevel ring gear 98 may also be coupled to or integrated onto a forward side or face of the main gear 74. The bevel ring gear extends 98 circumferentially about (e.g., completely around) the axial centerline 72, which is also a rotational axis of the bevel ring gear 98. The bevel ring gear 98 may have a smaller radius than that of the main gear 74. The bevel input gear 96 is disposed perpendicular to, and perpendicularly engages, the bevel ring gear 98. The bevel input gear 96 includes beveled teeth engaged with (e.g., meshed with) beveled teeth of the bevel ring gear 98. This configuration of the rotor 94, the e-motor input shaft 84, the bevel input gear 96, the bevel ring gear 98, and the main gear 74, enables the rotor 94 to facilitate rotation of the main gear 74 and the output shaft 60. However, the present disclosure is not limited to any particular number, arrangement, size, or other geared configuration that couples the e-motor input shaft 84 to the gear assembly 64 in a perpendicular manner with respect to their axes.

The electric motor 90 also includes a static structure 100 that supports and houses the rotor 94. The static structure 100 is fastened or coupled to the gearbox housing 70. The electric motor 90 is structurally integrated perpendicular to the gearbox 56. The placement and isolation of the electric motor 90 may reduce external loads transmitted to the electric motor 90. Additionally, electric motors that are connected directly to an output shaft (e.g., propeller shaft) are low-speed, high-torque electric motors with larger diameters. The perpendicular disposition of the electric motor 90 allows for a reduced forward area of the combined drivetrain 26, which also reduces aircraft drag caused by a size of the propulsion system 20.

The engine 22 is coupled to the gear assembly 64 via the input shaft 58. The gearbox 56 is disposed between the engine 22 and the electric motor 90 such that the output speed of the engine 22 may be reduced to match the output speed of the electric motor 90. The input shaft 58 may rotate independent of or in conjunction with the rotor 94 based on the whether respective coupling/decoupling devices (e.g., clutches) are engaged with the gear assembly. For example, with respect to the electric motor 90, a coupling/decoupling device may be disposed between the rotor 94 and the bevel input gear 96. The input shaft 58 is coupled, directly or indirectly, with the one or more offset gears 76A, 76B of the reduction gear assembly, and the one or more offset gears 76A, 76B may be engaged, directly or indirectly, with the main gear 74. Thus, with respect to the engine 22, a coupling/decoupling device may be disposed between the one or more offset gears 76A, 76B and one or more intermediate gears 102, or between the engine 22 and an input shaft gear 104.

The propulsor 24 is configured for rotation about the axial centerline 72 as shown in FIG. 4. The propulsor 24 of FIG. 4 is configured as a propeller that includes a hub 106 and propeller blades 108 mounted to the hub 106. The propeller blades 108 are circumferentially distributed about the hub 106, for example, relative to the axial centerline 72. The propeller blades 108 may be configured as variable-pitch propeller blades. For example, the propeller blades 108 may each be rotatable about a lengthwise axis to control (e.g., selectively vary) a pitch (e.g., an angle; sometimes referred to as a "beta angle") of the propeller blades 108. The present disclosure, however, is not limited to propeller configurations for the propulsor 24 and the propulsor 24 may alternatively be configured as a fan (e.g., for a turbofan propulsion system), an open rotor propulsor, or another configuration of aircraft propulsion rotor. The propulsor 24 is supported by the output shaft 60 and bearings.

For configurations of the propulsion system 20 in which the propulsor 24 includes the variable-pitch propeller blades 108, a PCU 110 may control (e.g., modulate) the pitch of the propeller blades 108. For example, the PCU 110 may control the pitch of the propeller blades 108 to achieve a desired thrust of the propulsion system 20 (see FIG. 1) while the propulsor 24 rotation speed remains constant or substantially constant (e.g., a constant-speed propeller assembly). The PCU 110 may be coupled to the output shaft 60 at an interior or an exterior of the gearbox housing 70. The PCU 110 may feed oil from the second axial end 88 and through the output shaft 60 to the propeller blades 108.

An oil pump 112 may be coupled the third offset gear 76C of the gear assembly 64 and at an exterior of the gearbox housing 70. The oil pump 112 may be connected in fluid communication between an oil tank and the PCU 110, and may be configured to direct oil from the oil tank to the PCU 110. The PCU 110 may be configured to direct and control a flow of oil from the oil pump 112 through the output shaft 60, thereby controlling the pitch of the propeller blades 108. The oil may additionally provide lubrication for rotational components of the propulsor 24 and the engine 22 (e.g., the first rotational assembly 40 and/or the second rotational assembly 42) such as, but not limited to, bearings, shafts, gears and/or gear assemblies, and the like.

The electric motor assembly 62 may include the single electric motor 90 coupled to the output shaft 60 as shown, for example, in FIG. 4. Alternatively, the electric motor assembly 62 may include a plurality of electric motors distributed along the e-motor axis 92.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:
an engine comprising a first input shaft; and
a drivetrain coupled to the first input shaft, the drivetrain comprising an output shaft, a gear assembly, an electric motor, and a second input shaft,
the gear assembly comprising a main gear mounted to the output shaft, and a bevel ring gear integrated on a face of the main gear, wherein the main gear, the bevel ring gear, and the output shaft are rotatable about a first rotational axis,
the electric motor comprising a rotor rotatable about a second rotational axis, wherein the second rotational axis is perpendicular to the first rotational axis, and
the second input shaft coupling the rotor to the bevel ring gear, the second input shaft being rotatable about the second rotational axis.

2. The propulsion system of claim 1, further comprising a propulsor mounted on the output shaft and rotatable about the first rotational axis.

3. The propulsion system of claim 1, wherein the second input shaft extends from a proximal end coupled to the rotor to a distal end having a bevel input gear, and wherein the bevel input gear is perpendicularly engaged with the bevel ring gear.

4. The propulsion system of claim 1, further comprising a propeller control unit (PCU) coupled to the output shaft.

5. The propulsion system of claim 4, wherein the gear assembly comprises a reduction gear assembly including the main gear and at least one offset gear, the at least one offset gear being coupled to an accessory load.

6. The propulsion system of claim 5, wherein the main gear is engaged with the at least one offset gear.

7. The propulsion system of claim 5, wherein the accessory load comprises an oil pump connected in fluid communication with the PCU.

8. The propulsion system of claim 1, wherein the gear assembly comprises a reduction gear assembly including the main gear and at least one offset gear, the at least one offset gear being coupled to the first input shaft, and the first input shaft being rotatable about a third rotational axis radially offset from the first rotational axis.

9. The propulsion system of claim 1, wherein the drivetrain further comprises a gearbox housing, and the electric motor further comprises a static structure engaged with the rotor and coupled to the gearbox housing.

10. A propulsion system for an aircraft, the propulsion system comprising:
an engine comprising a first input shaft; and
a drivetrain coupled to the first input shaft, the drivetrain comprising an output shaft, a reduction gear assembly, and an electric motor,
the reduction gear assembly comprising at least a main gear, a first offset gear, and a bevel ring gear, the main gear being mounted to the output shaft, the bevel ring gear being integrated on a face of the main gear, the first offset gear being coupled to the first input shaft, and the main gear, the bevel ring gear, and the output shaft being rotatable about a first rotational axis, and
the electric motor comprising a rotor rotatable about a second rotational axis, the second rotational axis being perpendicular to the first rotational axis, and the rotor being coupled to the bevel ring gear.

11. The propulsion system of claim 10, further comprising a propulsor mounted on the output shaft and rotatable about the first rotational axis.

12. The propulsion system of claim 10, wherein the drivetrain further comprises a second input shaft rotatable about the second rotational axis and coupling the rotor to the bevel ring gear.

13. The propulsion system of claim 12, wherein the second input shaft extends from a proximal end coupled to the rotor to a distal end having a bevel input gear, and wherein the bevel input gear is perpendicularly engaged with the bevel ring gear.

14. The propulsion system of claim 10, wherein the first input shaft is rotatable about a third rotational axis that is radially offset from the first rotational axis.

15. The propulsion system of claim 10, further comprising a propeller control unit (PCU) coupled to the output shaft.

16. The propulsion system of claim 15, wherein the reduction gear assembly further comprises a second offset gear coupled to an accessory load.

17. The propulsion system of claim 16, wherein the main gear is engaged with the second offset gear.

18. The propulsion system of claim 16, wherein the accessory load comprises an oil pump connected in fluid communication with the PCU.

19. The propulsion system of claim 10, wherein the drivetrain further comprises a gearbox housing, and the electric motor further comprises a static structure engaged with the rotor and coupled to the gearbox housing.

20. A propulsion system for an aircraft, the propulsion system comprising:
an engine comprising an input shaft;

a drivetrain coupled to the input shaft, the drivetrain comprising an output shaft, a gear assembly, and an electric motor, the gear assembly comprising a main gear mounted to the output shaft, and a bevel ring gear integrated on a face of the main gear, wherein the main gear, the bevel ring gear, and the output shaft are rotatable about a first rotational axis, and the electric motor comprising a rotor rotatable about a second rotational axis, wherein the second rotational axis is perpendicular to the first rotational axis, and the rotor is coupled to the bevel ring gear; and a propeller control unit (PCU) mounted on the output shaft.

*   *   *   *   *